(12) United States Patent
Lounis et al.

(10) Patent No.: US 9,673,690 B2
(45) Date of Patent: Jun. 6, 2017

(54) ELECTROMAGNETIC RETARDER ROTOR FOR A VEHICLE, RETARDER COMPRISING SUCH A ROTOR, AND VEHICLE PROVIDED WITH SUCH A RETARDER

(71) Applicant: TELMA, Saint Ouen l'Aumone (FR)

(72) Inventors: Rafik Lounis, Pontoise (FR); Nicolas Quennet, Cormeilles en Parisis (FR)

(73) Assignee: TELMA, Saint Quen l'Aumone (FR)

( * ) Notice: Subject to any disclaimer, the term of this patent is extended or adjusted under 35 U.S.C. 154(b) by 0 days.

(21) Appl. No.: 14/425,351

(22) PCT Filed: Sep. 3, 2013

(86) PCT No.: PCT/FR2013/052030
§ 371 (c)(1),
(2) Date: Mar. 3, 2015

(87) PCT Pub. No.: WO2014/033420
PCT Pub. Date: Mar. 6, 2014

(65) Prior Publication Data
US 2015/0236578 A1    Aug. 20, 2015

(30) Foreign Application Priority Data
Sep. 3, 2012   (FR) ...................................... 12 58182

(51) Int. Cl.
*F16D 65/12*    (2006.01)
*H02K 49/04*    (2006.01)
(Continued)

(52) U.S. Cl.
CPC ... *H02K 49/046* (2013.01); *F16D 2065/1304* (2013.01); *F16D 2065/788* (2013.01)

(58) Field of Classification Search
CPC ........... F16D 63/002; F16D 2065/1304; F16D 2065/1328; F16D 2065/134;
(Continued)

(56) References Cited

U.S. PATENT DOCUMENTS 2,380,085 A * 7/1945 Tack ..................... F16D 65/128
188/218 XL
2,745,518 A * 5/1956 Bachman .............. F16D 65/123
188/218 XL
(Continued)

FOREIGN PATENT DOCUMENTS

AT           508877 A2    4/2011
EP          0537723 A2    4/1993
(Continued)

OTHER PUBLICATIONS

English machine translation of EP-0537723.*
International Search Report, dated Jan. 8, 2014, from corresponding PCT application.

*Primary Examiner* — Melody Burch
(74) *Attorney, Agent, or Firm* — Young & Thompson

(57) ABSTRACT

An electromagnetic retarder rotor (1) for a vehicle, includes: an armature (2) having an inner surface (4); an end (5) having an inner surface that faces the inner surface (4) of the armature (2) and is at a distance therefrom, the end (5) being secured to the armature (2); a ring (13) for coaxial attachment to the armature (2); and an arm (15) defined between an upper edge and a lower edge and having a first end portion secured to the inner surface (7) of the end (5), on the lower edge, and a second end portion secured to the attachment ring (13), the upper edge of the arm (15) being at a distance from the inner surface of the armature (2) over the entire radial dimension of the arm (15).

9 Claims, 9 Drawing Sheets

(51) Int. Cl.
*F16D 65/10* (2006.01)
*F16D 65/78* (2006.01)
*F16D 65/02* (2006.01)

(58) Field of Classification Search
CPC ....... F16D 2065/1392; F16D 2065/788; F16D 65/813; F16D 65/853; H02K 49/046
USPC ... 188/218 XL, 264 R, 264 A, 264 AA, 160, 188/161
See application file for complete search history.

(56) References Cited

U.S. PATENT DOCUMENTS

| | | | | |
|---|---|---|---|---|
| 4,913,266 | A * | 4/1990 | Russell | F16D 3/78 188/18 A |
| 6,119,820 | A * | 9/2000 | Steptoe | F16D 65/128 188/218 XL |
| 6,405,839 | B1 * | 6/2002 | Ballinger | F16D 65/0006 188/218 XL |
| 2006/0243546 | A1 * | 11/2006 | Oberti | F16D 65/123 188/218 XL |

FOREIGN PATENT DOCUMENTS

| | | |
|---|---|---|
| FR | 1138752 A | 6/1957 |
| FR | 2044114 A5 | 2/1971 |
| FR | 2863787 A1 | 6/2005 |

* cited by examiner

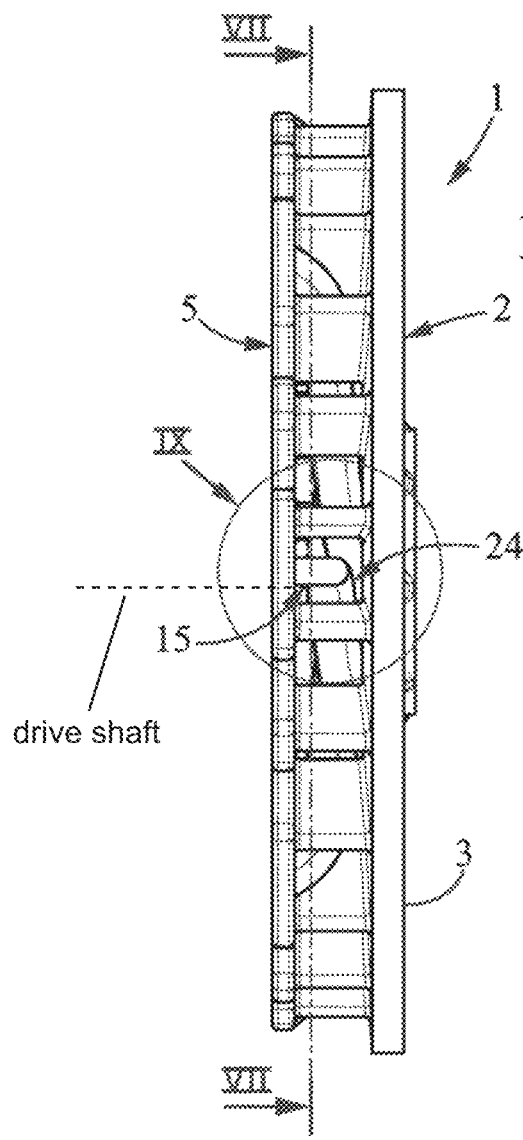
FIG. 8
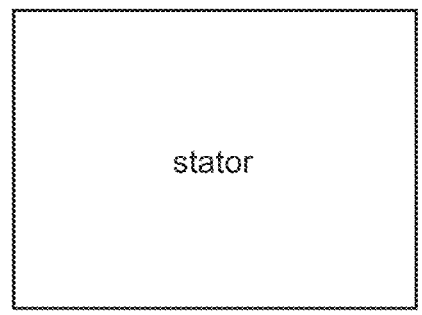
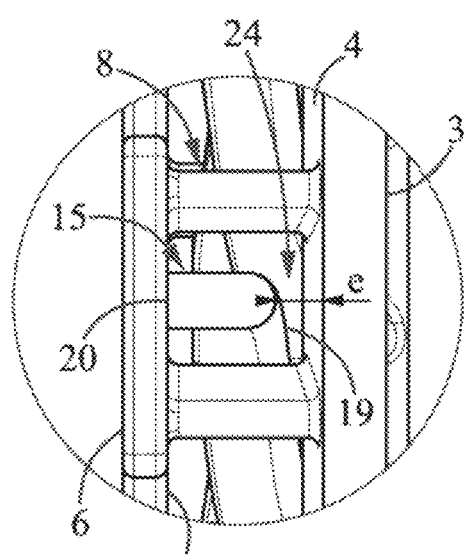
FIG. 9

ELECTROMAGNETIC RETARDER ROTOR FOR A VEHICLE, RETARDER COMPRISING SUCH A ROTOR, AND VEHICLE PROVIDED WITH SUCH A RETARDER

BACKGROUND OF THE INVENTION

The invention relates to the field of electromagnetic retarders, and more particularly to the rotors of such retarders.

Electromagnetic retarders are devices to supplement the brake systems of vehicles of any class, particularly land motor vehicles such as trains, heavy trucks, or light trucks, for which they are particularly advantageous.

During service braking of vehicles carrying a heavy load, because of their high inertia, there is such a large amount of energy to be dissipated in order to slow down or stop the vehicle with a conventional braking system that the elements of the braking system, particularly the pads, grow overheated which results in premature wear.

DESCRIPTION OF THE RELATED ART

Magnetic retarders were therefore developed to provide more durable braking, which slow the vehicle while dissipating a significant portion of the braking energy and thus reduce stress on the conventional braking system.

An electromagnetic retarder dissipates energy through the generation of eddy currents. The retarder generally comprises a stator, attached for example to the frame of the vehicle, and a rotor, mounted for example on a drive shaft which causes it to rotate. The stator and rotor are coaxially mounted to face one another, leaving a space called an air gap between them, one acting as an inductor of a magnetic field and the other acting as an armature.

In general, the stator acts as the inductor and typically comprises an electromagnet which generates a magnetic field when an electric current flows through it. The rotor comprises a conductive element called an armature which, when subjected to the magnetic field generated by the stator and rotated by the drive shaft, is traversed by eddy currents. Forces called Laplace forces then appear and oppose the rotor rotation. The braking torque produced and applied to the drive shaft slows down the vehicle.

The stator may be associated with one or more rotors, for example placed axially on each side of the stator.

A major problem with electromagnetic retarders is that eddy currents cause significant heating of the armature of the rotor, which degrades its physical properties and decreases retarder efficiency. In particular, the value of the retarder braking torque decreases when the armature temperature increases.

Means have therefore been developed for discharging this heat, in particular by conduction and by ventilation.

For this purpose, the rotor commonly comprises a cheek (also referred to herein as "end") secured to the armature by means of a plurality of radial fins. Some fins are extended to form arms which connect to an attachment ring, intended to be rotationally integral with the axle either directly or via a connecting part. The heat of the armature is thus carried away by the fins to the cheek where it is dissipated, with the fins also providing a ventilation effect.

Document FR 2584878 (LABAVIA) presents an example of a rotor for an electromagnetic retarder, where the fins forming crosspieces between the armature disc and the cheek are divided into at least two sections, angularly offset relative to one another and partially overlapping radially in a manner similar to tiles. Some of the fins extend to form arms and establish the connection with the drive shaft.

Document EP 0235306 (LABAVIA) presents a variant of a rotor for an electromagnetic retarder which proposes improving heat dissipation by providing striations or undulations on one face of the fins, in order to create air flow between the fins that is favorable to ventilation cooling.

Document FR 2864719 (TELMA) discloses another example of a rotor for an electromagnetic retarder. This document proposes changing the shape of the fins between the armature and the rotor cheek of FR 2584878 by making the sections closest to the center of the armature disc substantially planar and radial.

Although the solutions proposed in the prior art do produce a cooling effect, this remains insufficient, and the armature can still reach temperatures of around 700° C. to 800° C.

In addition, the arms connected to the attachment ring, armature, and rotor cheek are heavily stressed, particularly where they connect to the armature, because of:

the forces of magnetic attraction between armature and stator, tending to displace the rotor axially relative to the stator;

the braking torque applied to the drive shaft, and the resistance of the latter;

the inertia of the rotor.

The high temperature of the armature weakens the connection between arm and armature, which can reach temperatures of around 600° C. This degrades its mechanical resistance, and plastic deformation or cracks may occur which impact retarder function. It is possible for such deformation to allow contact between rotor and stator, or cause the connection to break, immobilizing the vehicle until the retarder is replaced.

There are retarders known as "Hydral" retarders which use a water cooling circuit of the engine to cool the retarder. However, their more complex design makes them more expensive and more difficult to mount on the vehicle.

A need therefore exists for a new electromagnetic retarder rotor which overcomes the above disadvantages.

SUMMARY OF THE INVENTION

A first object of the present invention is therefore to provide an electromechanical retarder rotor which has increased mechanical resistance to stresses.

A second object of the invention is to provide an electromagnetic retarder rotor which has a longer service life.

A third object of the invention is to provide an electromagnetic retarder rotor which reduces the need for replacement.

A fourth object of the invention is to provide a lower cost electromagnetic retarder rotor.

A fifth object of the invention is to provide an electromagnetic retarder rotor of reduced bulk.

For this purpose, a first aspect of the invention proposes an electromagnetic retarder rotor for a vehicle, said rotor comprising:

at least one armature having the form of an annular disc, adapted to be traveled by eddy currents under the effect of an electromagnetic field generated by a stator, the armature having an inner surface, at least one cheek (also referred to herein as "end") having the form of an annular disc coaxial to the armature and presenting an inner surface facing and at a distance from the inner surface of the armature, the cheek being secured to the armature, a ring for coaxial attachment to the armature, adapted to be rotationally integral with a drive shaft of the vehicle, at least one arm, defined between an upper edge and a lower edge and having a first end portion secured to the inner surface of the cheek by the lower edge, the first end portion extending between the inner surface of the cheek and the inner surface of the armature, and having a second end portion secured to the attachment ring.

Particularly advantageously, the invention proposes placing the upper edge of the arm at a distance from the inner surface of the armature along the entire radial dimension of the arm, so as to form a space between arm and armature.

The space thus formed considerably reduces the heat transfer between arm and armature, reinforcing the rotor resistance to high temperatures.

According to a preferred embodiment, the dimension of the space between the arm and the inner surface of the armature, in an axial direction, is between 6 mm and 12 mm, in order to provide a good compromise between space requirements and the establishing of a thermal barrier to increase rotor performance.

Preferably, this dimension is greater than or equal to 8 mm.

Preferably, the rotor comprises a plurality of fins between the inner surface of the cheek and the inner surface of the armature, integrally securing together the cheek and armature. The fins create paths for air currents to circulate and create a ventilation effect, encouraging the dissipation of heat.

According to a preferred embodiment, the arm has an inflection point between the first portion and the second portion when viewed in a plane perpendicular to the axis of rotation of the rotor, so as to form an S, rendering it particularly resistant to the mechanical stresses applied during use of the rotor.

The second end portion of the arm curves, for example, in a plane perpendicular to the axis of rotation of the rotor. The arm can then comprise an intermediate portion between the first end portion and second end portion, said intermediate portion curving in a plane perpendicular to the axis of rotation of the rotor, with a radius of curvature that is inverted relative to the radius of curvature of the second end portion. The resistance of the arm is thereby further increased.

The radius R1 of curvature of the second end portion and the radius of curvature R2 of the intermediate portion of the arm are selected so as to satisfy the following formula:

$$10\% \le \left|1 - \frac{R2}{R1}\right| \le 20\%$$

For example, the radii of curvature R1 and R2 are such that:

$$\left|1 - \frac{R2}{R1}\right| = 15\%$$

The arm extends, for example, at a 45° angle in a plane perpendicular to the axis of rotation of the rotor.

According to a preferred embodiment, the first end portion of the arm extends radially in a plane perpendicular to the axis of rotation of the rotor.

Preferably, the rotor comprises a plurality of arms.

A second aspect of the invention provides an electromagnetic retarder, in particular for a vehicle, comprising at least one stator adapted to induce an electromagnetic field when it is traveled by an electric current, and at least one rotor as described above, the outer surface of the armature, opposite the inner surface of the armature, facing the stator and at a distance from the stator.

The service life of the retarder is thus increased by the novel rotor, which is more resistant to high temperatures.

A third aspect of the invention provides a vehicle comprising a drive shaft between a motor and a means of movement such as a wheel, and comprising at least one electromagnetic retarder as described above. The stator is secured to the vehicle frame, and the attachment ring is mounted on a drive shaft such that the rotor is driven rotationally by the drive shaft.

The vehicle, even if a heavy vehicle, can thus slow down or stop more quickly due to the retarder being less sensitive to high temperatures.

BRIEF DESCRIPTION OF THE DRAWING FIGURES

Other features and advantages will become apparent from reading the following description with reference to the accompanying drawings, in which:

FIG. 8 is a side view of the rotor of FIG. 5;

FIG. 9 is a detailed view of FIG. 8;

DETAILED DESCRIPTION OF THE INVENTION

Figure 1:
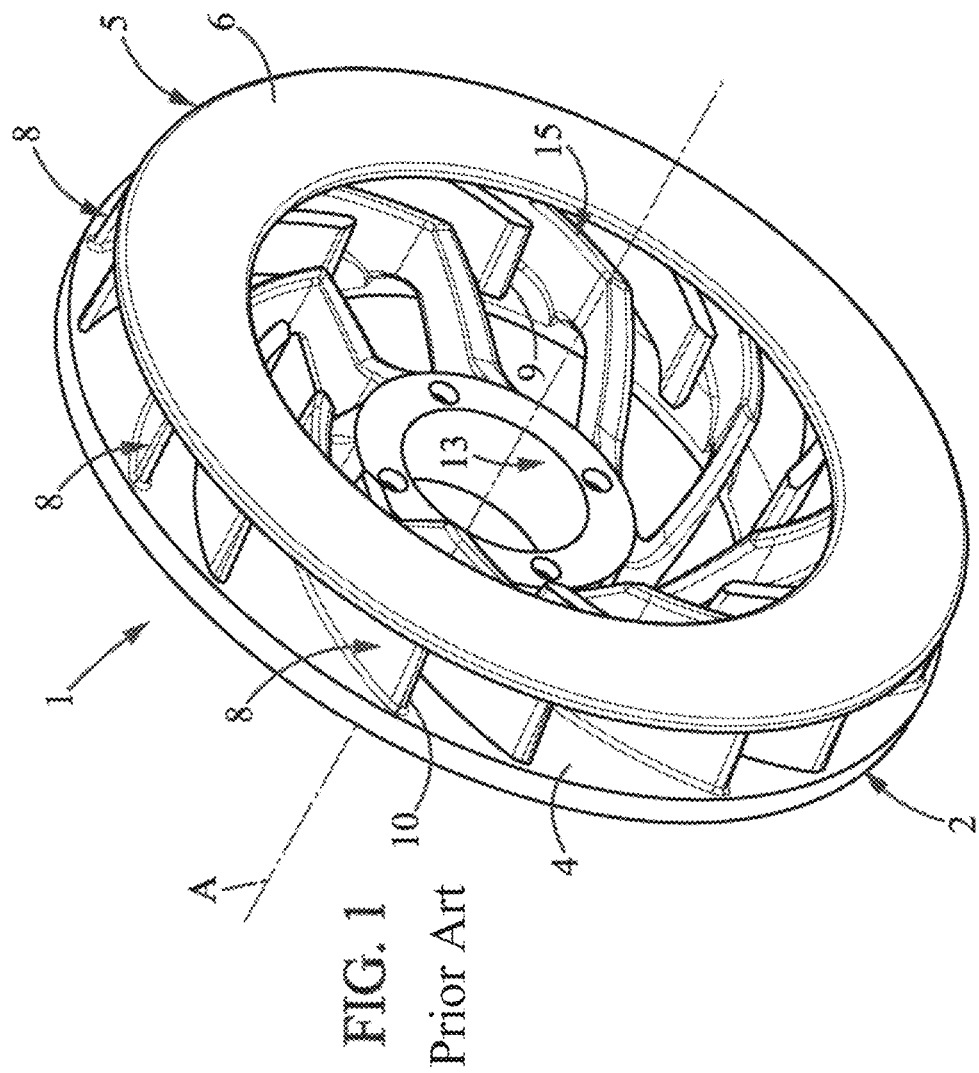
FIG. 1 is a perspective view of a rotor according to the prior art.
Figure 2:
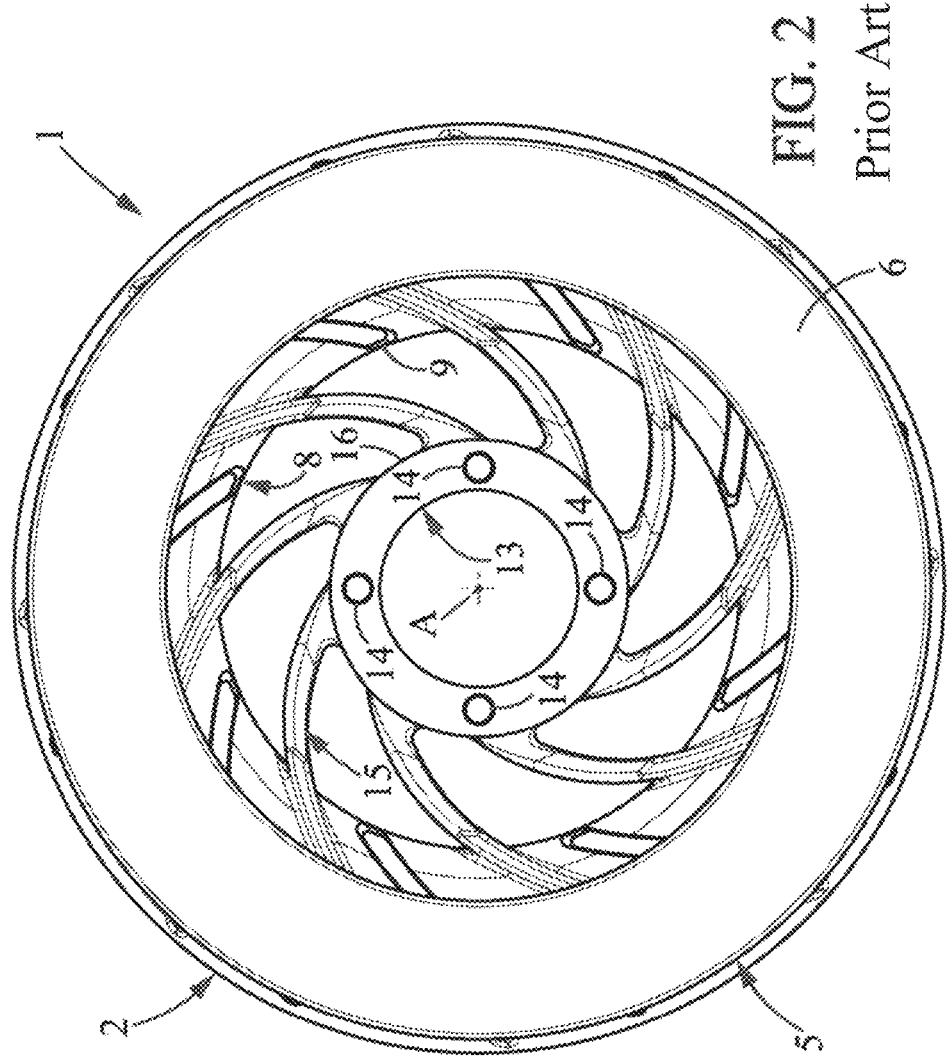
FIG. 2 is a front view of the rotor of FIG. 1.
Figure 3:
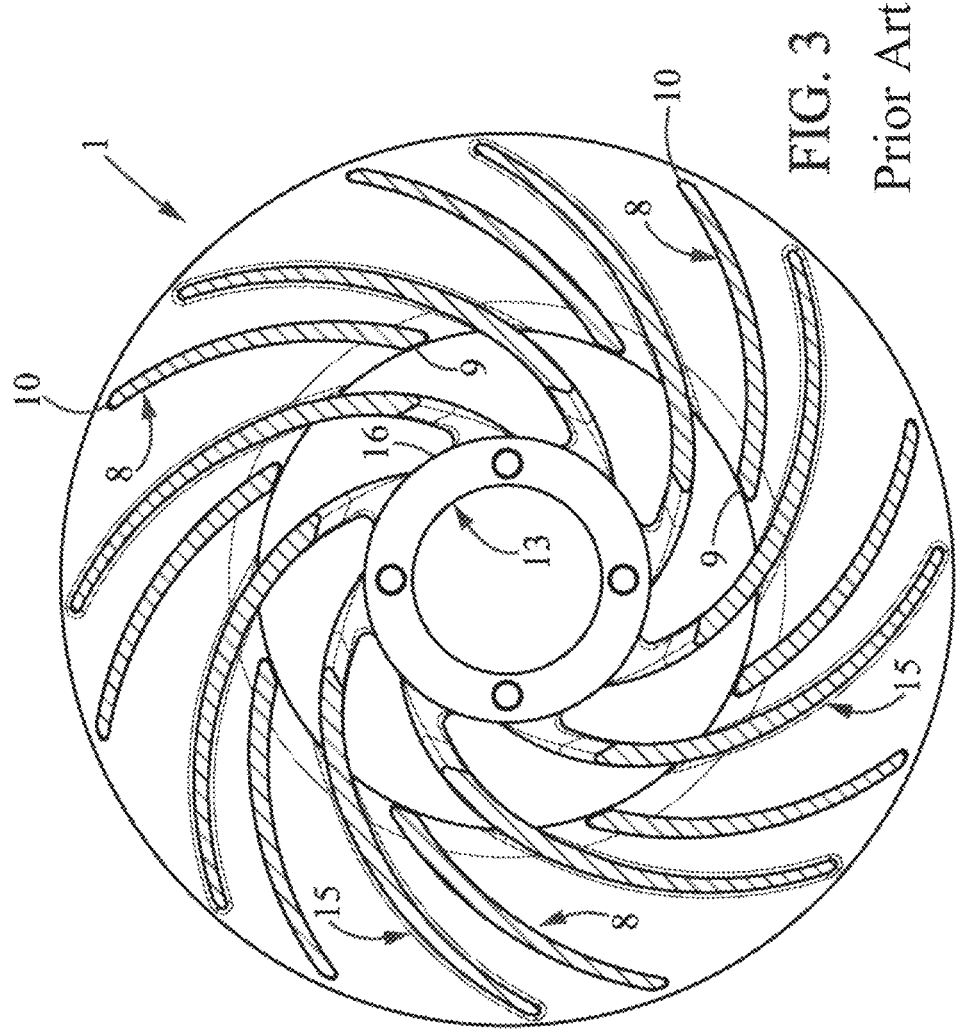
FIG. 3 is a view similar to that of FIG. 2, with the cheek of the rotor removed.
Figure 4:
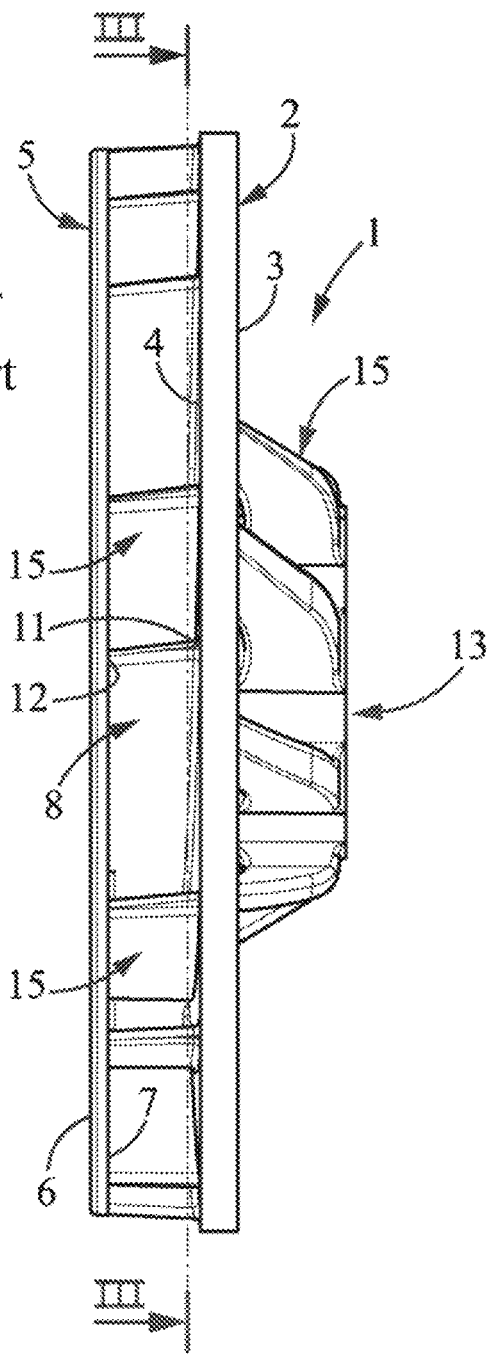
FIG. 4 is a side view of the rotor of FIG. 1.
Figure 5:
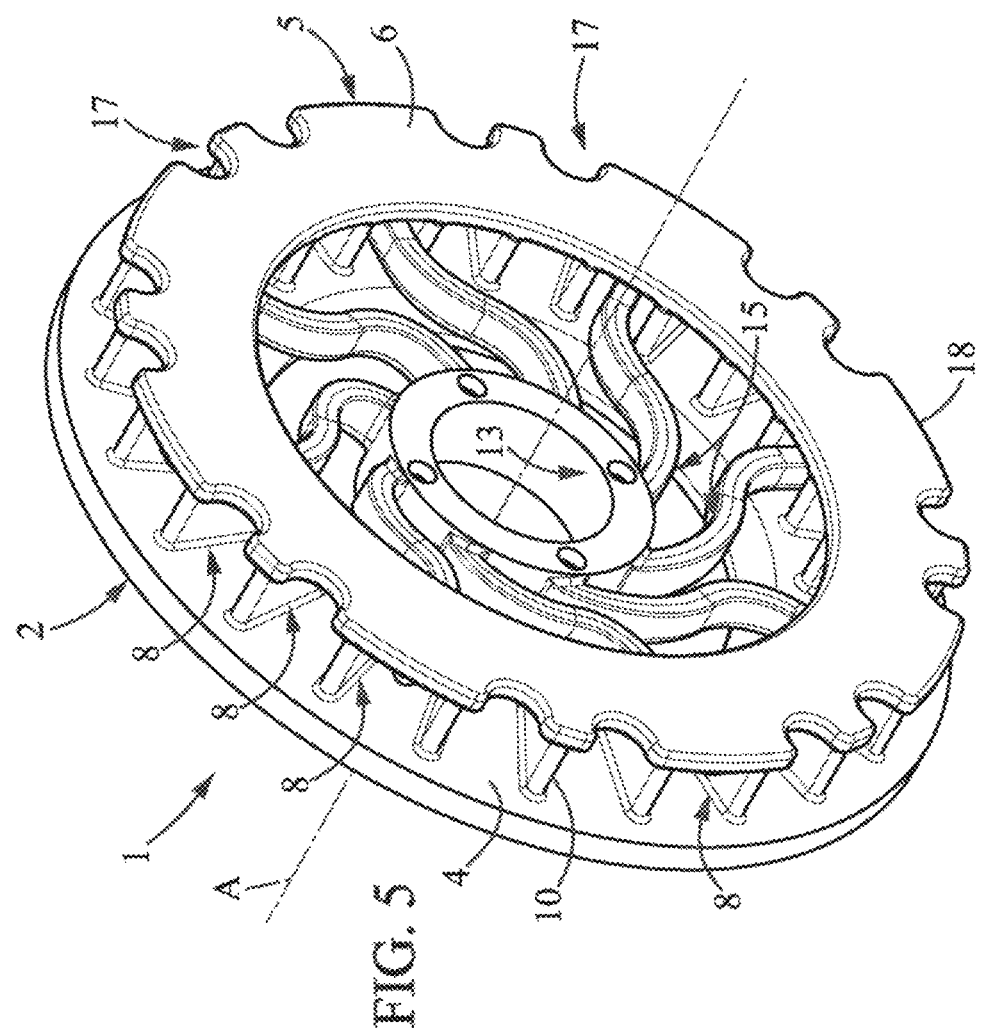
FIG. 5 is a perspective view of a novel rotor according to the invention.
Figure 6:
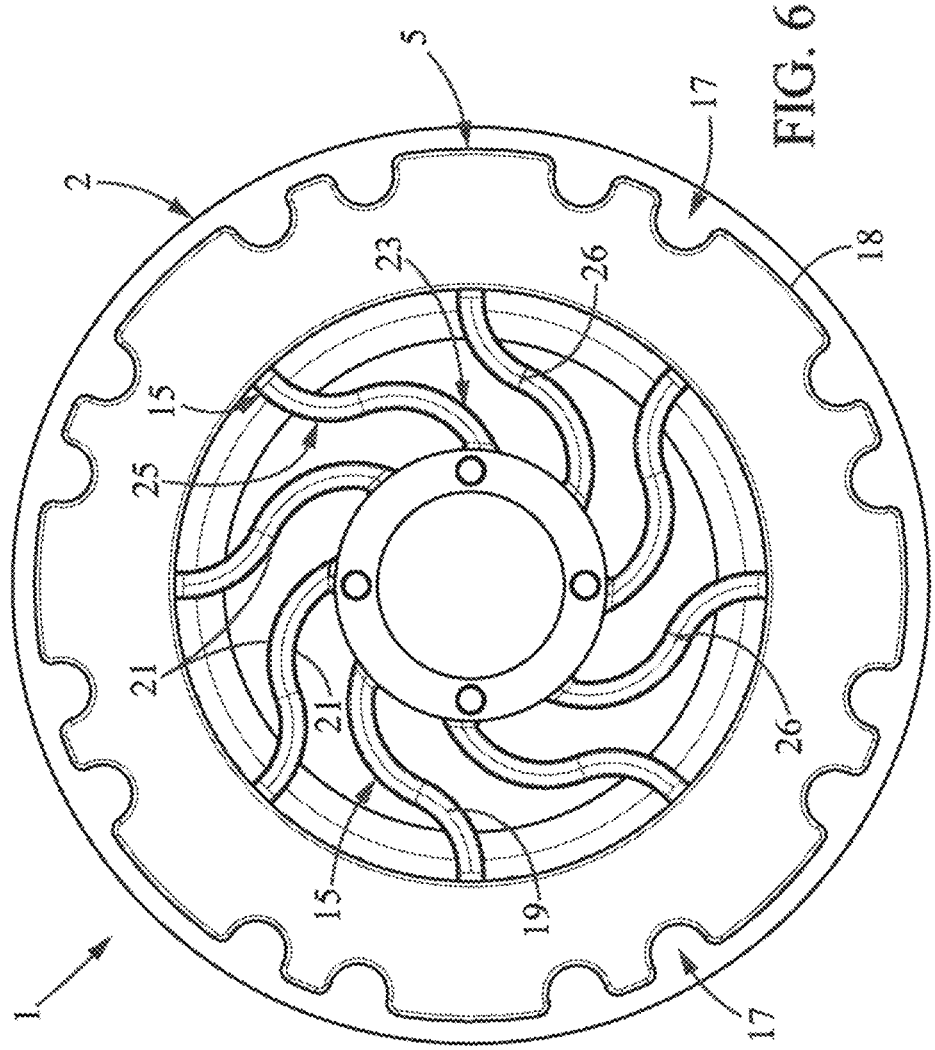
FIG. 6 is a front view of the rotor of FIG. 5.
Figure 7:
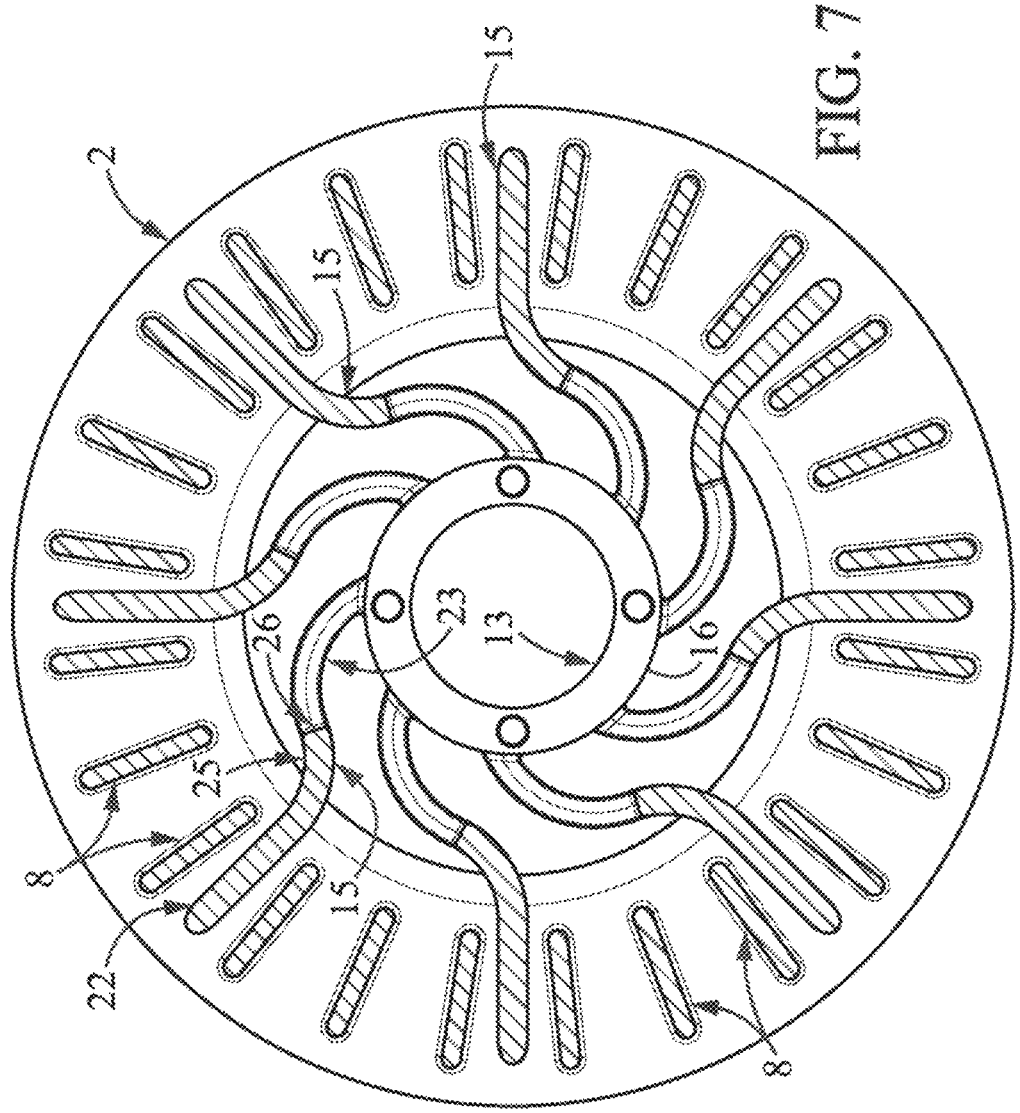
FIG. 7 is a view similar to that of FIG. 6, with the cheek of the rotor removed.

FIGS. 1 to 4 represent an electromagnetic retarder rotor 1 for a motor vehicle, according to the prior art. The rotor is preferably in the form of a single part, molded from ferromagnetic material. The retarder further comprises a stator as described in the introduction, not illustrated, with an air gap between the stator and the rotor. The rotor 1 is, for example, rotationally integral with a drive shaft between the engine and means of movement such as wheels, while the stator is secured to the vehicle frame.

The rotor 1 comprises an armature 2 in the form of an annular disc, and has an outer surface 3 and an inner surface 4 which are substantially planar but not necessarily parallel. The rotor 1 further comprises a cheek 5 in the form of a disc, also annular, having an outer surface 6 and an inner surface 7 which are substantially planar. The armature 2 and cheek 5 are coaxially positioned on axis A which is the axis of rotation of the rotor 1, so that their inner surfaces 4, 7 face one another with distance between them. For example, the inner diameter of the cheek 5 is preferably greater than or equal to the inner diameter of the armature 2, while the outer diameter of the cheek 5 is preferably less than or equal to the outer diameter of the armature 2. The thickness of the armature 2 is preferably greater than the thickness of the cheek 5.

In the following description, the term "axial" refers to the direction parallel to the axis A of the discs, in other words the axis of rotation, and the term "radial" refers to the direction parallel to the radii of the discs of the armature 2 and cheek 5.

The armature 2 and cheek 5 are secured to each other, such that a portion of the heat generated in the armature 2 by eddy currents is transferred to the cheek 5 by conduction, which dissipates the heat into the air.

Preferably, fins 8 are uniformly distributed in a radial ring between armature 2 and cheek 5 and extend from one inner surface to the other, securing together the armature 2 and cheek 5 by forming crosspieces between them. The fin 8 has, for example, the form of a curved plate defined between an inner edge 9 and an outer edge 10 which are straight, and between an upper edge 11 secured to the inner surface 4 of the armature 2 and a lower edge 12 secured to the inner surface 7 of the cheek 5, the upper edge 11 and lower edge 12 being curved. Advantageously, the outer edge 10, meaning the one furthest from the axis A of rotation, does not extend beyond the periphery of the armature 2 or of the cheek 5, so to reduce the space occupied.

Thus, when the rotor 1 is rotated about the axis A of rotation, the fins 8 facilitate air circulation in the passages defined between the fins 8 in order to cool the rotor 1, and more particularly the armature 2, with the direction of curvature of the fins 8 corresponding for example to the direction of rotation of the rotor 1 about the axis A of rotation.

The rotor 1 advantageously comprises an attachment ring 13 in the form of a hollow cylinder coaxial to the armature 2 and cheek 5, for rotationally securing the rotor 1 to a drive shaft of the vehicle. The ring 13 can be mounted on the shaft directly or via an intermediate part. For this purpose, the ring 13 is advantageously provided with holes 14 extending axially, to allow insertion of fastening means between the ring 13 and the drive shaft or intermediate part.

The rotor 1 also comprises arms 15, advantageously formed as the extension of certain fins 8, which follow the curvature of the fins 8 and extend all the way to the ring 13, where they are attached for example to its cylindrical surface 16. Preferably, the arms 15 are regularly distributed on the inner surfaces 4, 7 of the armature 2 and cheek 5, for example eight arms 15 with one every 45°.

The arms 15 connect to the ring 13 on its axial cylindrical surface 16. The location where the arms 15 connect to the ring 13 may be axially offset from where the arms 15 are attached to the armature 2 and cheek 5, the arm 15 then forming an S-shape in a plane parallel to the axis A of rotation.

The arms 15 which form extensions of fins 8 are therefore secured to both the cheek 5 and the armature 2.

As indicated in the introduction, the rotor 1 of the prior art has a weakness at the connection between the arm 15 and the armature 2, in particular because of the high temperature of the armature 2.

A novel rotor 1 according to the present invention is illustrated in FIGS. 5 to 10, where the connection between arm and armature has been eliminated.

The same references as those used for the rotor of FIGS. 1 to 4 are used to designate the same elements of the novel rotor 1.

More specifically, as above, the novel rotor 1 comprises an armature 2 and a cheek 5 secured to each other, both in the form of annular discs having an inner surface 4, 7 that is substantially planar, the inner surface 7 of the cheek 5 facing the inner surface 4 of the armature 2. Fins 8 are uniformly distributed between the armature 2 and cheek 5. They extend from the inner surface 4 of the armature 2 and connect to the inner surface 7 of the cheek 5. The rotor 1 also comprises an attachment ring 13. These elements may be substantially identical to those already described with reference to FIGS. 1 to 4 concerning the prior art rotor.

In the preferred embodiment, which is the one shown in FIGS. 5 to 10, the cheek 5 is provided with regularly distributed pairs of notches 17 on its outer periphery 18. These notches 17 reduce the mass of the rotor 1 and therefore the manufacturing costs, while retaining the mechanical properties.

The rotor 1 according to the invention also comprises at least one arm 15, in practice a plurality of arms 15, each located between two fins 8, for securing the ring 13 to the armature 2 and cheek 5. However, unlike the rotors of the prior art, each arm 15 is not directly attached to the armature 2.

More specifically, in the invention each arm 15 is defined between an upper edge 19, a lower edge 20, and two side edges 21, and has a first end portion 22 secured to the inner surface 7 of the cheek 5 and a second end portion 23 secured to the attachment ring 13. The first end portion 22 of the arm 15, illustrated in particular in FIG. 7, therefore extends between the inner surface 4 of the armature 2 and the inner surface 7 of the cheek 5 while being attached to the inner surface 7 of the cheek 5 by its lower edge 20, but the upper edge 19 remains at a distance from the inner surface of the armature in the axial direction.

Each arm 15 is thus secured to the cheek 5 by the lower edge 20, while a space 24 is formed between the inner surface 4 of the armature 2 and the upper edge 19 of each arm 15, and this remains true for the entire radial dimension of the arm 15. As air is a poor heat conductor, little or no heat is transmitted to the arms 15 by the armature 2.

Dimension e of space 24, particularly visible in FIG. 9, which is the distance between the upper edge 19 of the first portion 22 of the arm 15 and the inner surface 4 of the armature 2, measured in the axial direction, is chosen as a compromise between establishing a thermal barrier between arms 15 and armature 2, and limiting the occupied volume. Dimension e of space 24 is preferably between 6 mm and 12 mm. This dimension may not be constant over the length of arm 15. The influence of the temperature of the armature 2 on the arm 15 is then greatly reduced.

Below 6 mm, dimension e of space 24 is insufficient to allow air to flow and thus to reduce the arm temperature significantly. Above 12 mm, the influence of the thermal barrier on the temperature of the arms 15 is no longer appreciable, so that the resulting bulk of the device is no longer offset by an advantage in the temperature of the arms 15.

Therefore by maintaining dimension e of space 24 between 6 mm and 12 mm, the temperature of the arms 15 measured on their first end portion 22 is up to 58% lower compared with the temperature of the same arm portion when it is connected to the armature as is the case in prior art rotors. For the novel rotor, the temperature of the arms 15 is therefore lower than in prior art arms, so the novel rotor can be used in demanding applications, meaning those that generate higher temperature increases in the rotor 1 over longer periods than in normal applications.

Preferably, dimension e of space 24 is at least equal to 8 mm along the entire arm 15 in order to ensure sufficient heat insulation.

The arms 15 are therefore only in contact with the cheek 5 but still ensure rotation of the armature 2. The temperature of the cheek 5, generally about 450° C., is lower than that of the armature 2, which allows maintaining a connection with the arm 15 that is more resistant to stresses. In addition, the movement in translation of the rotor 1 along the axis A of rotation is first transmitted to the fins 8, then to the cheek 5, and lastly to the connection between arms 15 and cheek 5, reducing deformations at the connection between arms 15 and cheek 5: deformation first occurs at the connections between the fins 8 and the armature 2 and cheek 5.

Similarly, the inertia of the rotor 1 has a reduced effect in terms of deformation on the connection between arms 15 and armature 2, as the fins absorb some of this.

Although the contact surface between armature 2 and cheek 5 is reduced compared to rotors of the prior art, because the connection between arms 15 and armature 2 is eliminated, which reduces the conduction phenomenon between armature 2 and cheek 5 for cooling the armature, the novel rotor 1 of the invention has a greater resistance to stress.

We will now describe a preferred embodiment of the arm 15, having a shape which increases the mechanical strength of the rotor 1.

The first portion 22 is a straight portion which extends radially between the inner surfaces 4, 7 of the armature 2 and cheek 5.

The second portion 23 curves in a plane perpendicular to the axial direction, meaning that the side edges 21 of the arm 15 are curved.

An intermediate portion 25 connects the first portion 22 to the second portion 23. The intermediate portion 25 also curves in a plane perpendicular to the axial direction, but the direction of curvature is opposite that of the second portion 23.

Thus, the arm 15, when viewed in a plane perpendicular to the axial direction, has an inflection point 26 between the second portion 23 and the intermediate portion 25, so as to form an S.

The novel shape of the arms 15 allows better distribution of stresses over their entire length, avoiding the concentration of stresses at the connections with the ring 13 and cheek 5. In addition, the S-shape of the arm 15 encourages radial elastic deformation, reducing the risk of breakage. By combining the novel form of the arms 15 with the characteristic of the arms 15 not being directly attached to the armature 2, deformations of the arms 15 are considerably reduced.

The dimensions of the arms 15 are chosen to ensure good heat exchange with the external environment by the side edges 21, while limiting heat conduction by the arm 15 section.

Figure 10:
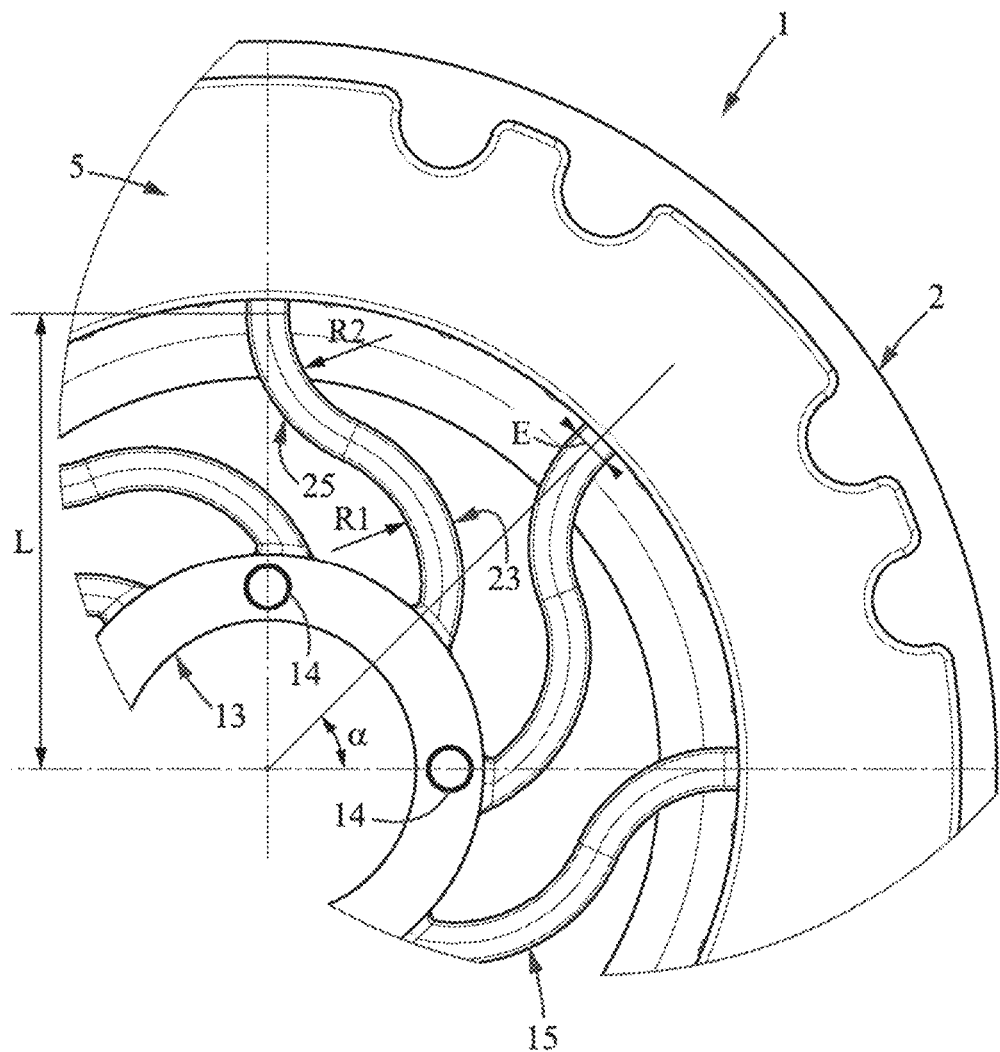
FIG. 10 is a detailed view of the rotor of FIG. 6.

Table 1 provides some example numerical values for the arm dimensions, in mm, in reference to FIG. 10.

TABLE 1

| | |
|---|---|
| thickness E of arm | 15 |
| length L of arm | 163 |
| radius R1 of curvature | 50 |
| radius R2 of curvature | 57.5 |

Thickness E of the arm 15 corresponds to its transverse dimension, perpendicular to the radial direction, measured in the first portion 22 of the arm 15. In the example illustrated, thickness E of the arm 15 remains constant with the side edges 21 being parallel, but it can be variable.

Length L of the arm 15 here corresponds to the radial dimension of the second portion 23 and the intermediate portion 25, measured from the center of the discs of the armature 2 and cheek 5.

Radius R1 of curvature is the radius of curvature of the second portion 23 of the arm 15, and radius R2 of curvature is the radius of curvature of the intermediate portion 25 of the arm 15.

Generally, radii R1 and R2 of curvature of curved portions 23, 25 of the arms 15 are selected so as to satisfy the following relationship:

$$10\% \leq \left|1 - \frac{R2}{R1}\right| \leq 20\% \quad (1)$$

For example, radii R1 and R2 of curvature of the arms 15 are such that:

$$\left|1 - \frac{R2}{R1}\right| = 15$$

When radii R1 and R2 of curvature satisfy relation (1), the arm 15 is then particularly suited for withstanding demanding rotor applications. The Applicant has found that the risk of arm breakage is greatly reduced when relation (1) is satisfied. In particular, the inversion of the radius of curvature between the second end 23 of the arm 15 and the intermediate portion 25 encourages elastic deformation of the arm 15. In addition, when relation (1) is satisfied, the change in curvature is not too abrupt, ensuring that stresses are distributed over the two curved portions 23, 25 of the arm. Lastly, the change of radius of curvature in the proportion of relation (1) ensures that stresses are optimally distributed over the two curved portions 23, 25 of the arm 15.

Each arm 15 extends at an angle of approximately 45°, meaning that the angle α between the location where the arms 15 connect to the ring 13 and the first portion 22, measured in a plane perpendicular to the axial direction, is approximately 45°.

Preferably, the fins 8 are distributed in a regular angular distribution, as are the arms 15. The fins 8 and arms 15 are not coincident, however. An arm 15 is therefore not substituted for a fin 8 in the distribution of fins 8, and vice versa.

The novel rotor 1 thus formed provides increased resistance to stress by strengthening the connection between the ring 13 and the assembly comprising the armature 2 and cheek 5, and more specifically by preventing any contact between arms 15 and armature 2.

For example, in the example of the rotor having the dimensions of Table 1, because of the minimum dimension e of 8 mm for the space 24 between arms 15 and armature 2, it was observed that the temperature of the arms 15 may be up to approximately 100° C. less than that of the arms of prior art rotors which do not include such a space.

In addition, the difference between the average temperature of the armature and the average temperature of the cheek is greater in the case of the novel rotor 1 than in the case of prior art rotors, indicating that heat transfer between armature 2 and cheek 5 is lower for the novel rotor 1.

Table 2 below shows the maximum temperature measured on the armature, the minimum temperature measured on an arm, the average temperature of the armature and the average temperature of the cheek, for a prior art rotor as presented in FIGS. 1 to 4 and for the novel rotor. The values in the table were obtained in a simulation of 1000 rpm for the rotor, and a power of 44000 W applied to the armature.

TABLE 2

|  | Prior art rotor | Novel rotor 1 |
|---|---|---|
| Maximum temperature (in ° C.) | 750 | 785 |
| Minimum temperature (in ° C.) | 160 | 65 |
| Average temperature of armature (in ° C.) | 678 | 666 |
| Average temperature of cheek | 267 | 194 |

The connection of the arms 15 to the attachment ring 13 is thus stronger than in prior art rotors: the risk of the arms 15 breaking at their connection to the ring 13 for the described rotor 1 is reduced, even in more demanding applications where the armature temperature is greater. The service life of the rotor 1 is increased.

When dimension e of space 24 is less than 8 mm, the heat transfer occurring between armature 2 and arm 15 does not provide significant improvement compared to an armature rigidly and directly attached to the arm.

The shape and dimensions of the arms 15 of the novel rotor 1 also provide increased rigidity.

The novel rotor 1 of the invention will therefore be usable in demanding applications where the temperature of the armature 2 is particularly high, while providing a long service life in the most common applications.

As the deformations first occur in the fins 8, they do not critically impact the retarder: their deformation does not prevent use of the retarder, so it is not necessary to replace it as soon as such deformations occur.

Manufacture of the novel rotor 1 does not impose any cost increase compared to rotors of the prior art, as no additional materials or parts are required.

Finally, the novel rotor 1 does not impose any increase in space requirements, as the overall dimensions remain substantially identical to those of rotors of the prior art.

The design of the novel rotor does not require any changes to the operation of the retarder. The novel rotor 1 can therefore be associated with existing stators or can be directly installed in vehicles already equipped with an electromagnetic retarder, as a replacement for old rotors.

The invention claimed is:

1. An electromagnetic retarder rotor (1) for a vehicle, said rotor comprising:
    at least one armature (2) having the form of an annular disc, adapted to be traveled by eddy currents under the effect of an electromagnetic field generated by a stator, the armature (2) having an inner surface (4),
    at least one cheek (5) having the form of an annular disc coaxial to the armature (2) and presenting an inner surface (7) facing and at a distance from the inner surface (4) of the armature (2), the cheek (5) being secured to the armature (2)
    at least one ring (13) for coaxial attachment to the armature (2), adapted to be rotationally integral with a drive shaft of the vehicle,
    a plurality of fins (8) extending from an inner surface of the armature (2) to an inner surface of the at least one cheek (5), the fins (8) integrally securing together the armature (2) and the at least one cheek (5) by forming crosspieces located between the inner surface (7) of the at least one cheek (5) and the inner surface (4) of the armature (2),
    at least one arm (15) extending from between two adjacent ones of the fins (8) and extending to the at least one ring (13), the at least one arm (15) defined between an upper edge (19) and a lower edge (20) and having a first end portion (22) secured to the inner surface (7) of the cheek (5) by the lower edge (20), the first end portion (22) extending between the inner surface (7) of the cheek (5) and the inner surface (4) of the armature (2), and having a second end portion (23) secured to the at least one attachment ring (13),
    wherein the upper edge (19) of the at least one arm (15) is spaced apart at a non-zero distance from the inner surface (4) of the armature (2) along the entire radial dimension of the at least one arm (15), so as to form a space (24) between the at least one arm (15) and the armature (2),
    wherein each at least one arm (15) is separate from and spaced apart from each other at least one arm (15),
    wherein the at least one arm (15) has an inflection point (26) when viewed in a plane perpendicular to an axis (A) of rotation of the rotor (1), so that the at least one arm (15) is in the form of an S,
    wherein the second end portion (23) of the at least one arm (15) curves in a plane perpendicular to the axis (A) of rotation of the rotor (1), and
    wherein the at least one arm (15) comprises an intermediate portion (25) between the first end portion (22) and the second end portion (23), the intermediate portion (25) curving in a plane perpendicular to the axis (A) of rotation of the rotor (1), with a radius (R2) of curvature that is inverted relative to the radius (R1) of curvature of the second end portion (23),
    wherein the radii (R1, R2) of curvature of the second end portion (23) and intermediate portion (25) of the at least one arm (15) are selected so as to satisfy the following relation:

$$10\% \leq \left|1 - \frac{R2}{R1}\right| \leq 20\%.$$

2. The rotor (1) according to claim 1, wherein the dimension (e) of the space (24) between the at least one arm (15) and the inner surface (7) of the armature (2), in an axial direction, is between 6 mm and 12 mm.

3. The rotor (1) according to claim 2, wherein the dimension (e) of the space (24) between the at least one arm (15) and the inner surface (7) of the armature (2) is greater than or equal to 8 mm.

4. The rotor (1) according to claim 1, wherein the radii (R1, R2) of curvature of the second end portion (23) and intermediate portion (25) of the at least one arm (15) are selected such that:

$$\left|1 - \frac{R2}{R1}\right| = 15\%.$$

5. The rotor (1) according to claim 1, wherein the at least one arm (15) extends at a 45° angle in a plane perpendicular to the axis (A) of rotation of the rotor (1).

6. The rotor (1) according to claim 1, wherein the first end portion (22) of the at least one arm (15) extends radially in a plane perpendicular to the axis (A) of rotation of the rotor (1).

7. The rotor (1) according to claim 1, wherein the at least one arm comprises a plurality of arms (15).

8. An electromagnetic retarder, comprising at least one stator adapted to induce an electromagnetic field when the at least one stator is traveled by an electric current, the retarder comprising at least one rotor (1) according to claim 1, the outer surface (3) of the armature (2), opposite the inner surface (4) of the armature (2), facing the at least one stator and at a distance from the at least one stator.

9. A vehicle comprising a drive shaft between a motor and a means of movement, together with at least one electromagnetic retarder according to claim 8, the at least one stator being secured to the vehicle frame, the at least one attachment ring (13) being mounted on a drive shaft such that the at least one rotor (1) is driven rotationally by the drive shaft.

\* \* \* \* \*